United States Patent [19]

Harasawa et al.

[11] Patent Number: 5,075,557
[45] Date of Patent: Dec. 24, 1991

[54] SIMPLIFIED APPARATUS AND METHOD FOR MEASURING QUANTITY OF ULTRAVIOLET RADIATION RECEIVED

[75] Inventors: Isamu Harasawa, Tokyo; Yoshihisa Suzuki, Uozu; Mitsuo Igami, Tokyo, all of Japan

[73] Assignee: Nippon Carbide Kogyo Kabushiki Kaisha, Tokyo, Japan

[21] Appl. No.: 460,103

[22] PCT Filed: Jun. 6, 1988

[86] PCT No.: PCT/JP88/00543
§ 371 Date: Feb. 6, 1990
§ 102(e) Date: Feb. 6, 1990

[87] PCT Pub. No.: WO89/12218
PCT Pub. Date: Dec. 14, 1989

[51] Int. Cl.[5] ................................................ G01J 1/50
[52] U.S. Cl. ................................... 250/474.1; 250/372
[58] Field of Search .................. 250/474.1, 372, 461.1, 250/461.2

[56] References Cited

U.S. PATENT DOCUMENTS

| | | | |
|---|---|---|---|
| 3,787,687 | 1/1974 | Trumble | 250/474.1 |
| 3,903,423 | 9/1974 | Zweig | 250/474.1 |
| 4,542,104 | 9/1985 | Stayer et al. | 250/461.2 |
| 4,788,433 | 11/1988 | Wright | 250/474.1 |
| 4,829,187 | 5/1989 | Tomita et al. | 250/474.1 |
| 4,863,282 | 9/1989 | Rickson | 250/474.1 |

Primary Examiner—Carolyn E. Fields
Assistant Examiner—Drew A. Dunn
Attorney, Agent, or Firm—Sherman and Shalloway

[57] ABSTRACT

A simplified apparatus for measurement of receipt light quantity of ultraviolet radiation wherein a colored material is carried on a solid support which material discolors or fades in accordance with the receipt of light quantity due to light receipt of ultraviolet radiation having wavelength in the range of at least 300 to 360 nm, and a method for measurement of ultraviolet radiation having wavelength in the range of at least 300 to 360 nm in sunlight which comprises exposing the above measurement apparatus to sunlight and monitoring discoloration or fading of the colored material of the measurement apparatus to detect receipt light quantity of ultraviolet radiation of the wavelengths.

5 Claims, 3 Drawing Sheets

SIMPLIFIED APPARATUS AND METHOD FOR MEASURING QUANTITY OF ULTRAVIOLET RADIATION RECEIVED

TECHNICAL FIELD

The present invention relates to a new simplified apparatus and method for measuring quantity of ultraviolet radiation received, and more specifically relates to a simplified apparatus and method for measurement of quantity of ultraviolet radiation received wherein quantity of ultraviolet radiation received can be detected by degree of discoloration or fading of a colored material supported on a solid support which material discolors or fades in accordance to amount of the received ultraviolet radiation of particular wavelength.

BACKGROUND TECHNIQUES

Heretofore, ultraviolet radiation intensity-measuring apparatus wherein a selenium photoelectric cell is used as a detector and a color filter glass transmitting ultraviolet radiation is combined thereto, and the like have been commercially available as ultraviolet radiation-measuring apparatuses. However, these measurement apparatuses have the disadvantage that it is only possible by these apparatuses to measure intensity of ultraviolet radiation at the point of time when measurement is carried out and it is impossible to measure total quantity of ultraviolet radiation received in a certain period of time as an integrated value.

Further, although ultraviolet radiation-measuring apparatuses wherein an integrator and a recorder are connected to such a measurement apparatus to make it possible to measure integrated value of quantity of ultraviolet radiation are commercially available, these apparatuses have disadvantages, for example, that they are very expensive and hard to easily carry, and thus they are used only in small numbers for research, etc.

Further, various simplified integrating pyrheliometers, for example, pyrheliometers wherein a chemical method such as a diazo photosensitive paper method, uranyl oxalate method, astra-benzene method or chlorophyl method is used have recently been made on an experimental basis and proposed for use in cultivation control of farm products. However, these pyrheliometers chiefly aim at measurement of amount of received beam in respect of visible radiation part useful for farm products, and thus it is impossible to specifically measure amount of received light in respect of beam in the ultraviolet region. Moreover, substances such as diazo compounds, uranyl oxalate and chlorophyl used in the above pyrheliometers have inconveniences, for example, that they must be prepared at the time of use because they coagulate at high temperature or at low temperature or have bad preservability, and further these substances have disadvantages of low accuracy, poor reproducibility, being poisonous and the like.

Thus, the present invention has been developed in order to obviate the above disadvantages which usual techniques have, and aim at provision of simple and highly accurate measurement apparatus and method which make it possible to measure integrated amount of received light in respect of ultraviolet radiation in the particular wavelength region.

DISCLOSURE OF THE INVENTION

Thus, according to the present invention is provided a simplified ultraviolet radiation receipt light amount-measuring apparatus characterized in that a colored material is supported on a solid support which material discolors or fades in accordance with the receipt light amount after light receipt of ultraviolet radiation having wavelength in the range of at least 300 to 360 nm.

There is further provided according to the invention a method for measurement of receipt light amount of ultraviolet radiation which comprises exposing the above measurement apparatus to sunlight and monitoring discoloration or fading of the colored material in the measurement apparatus to detect receipt light amount of ultraviolet radiation having wavelength in the range of at least 300 to 360 nm.

DETAILED DESCRIPTION OF THE INVENTION

Figure 1:
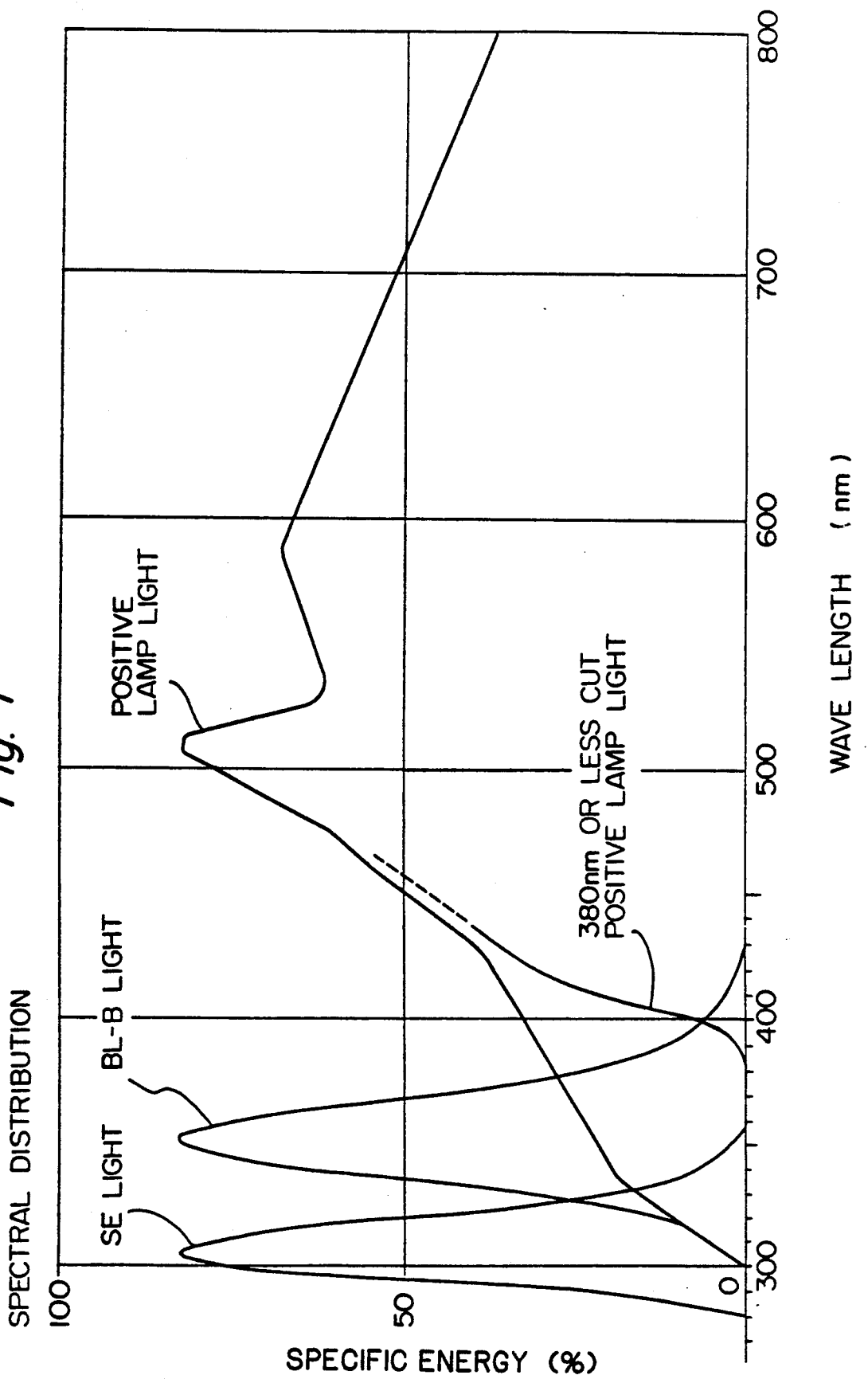
FIG. 1 is a spectral distribution drawing of various receipt lights.

Colored materials to be used in the apparatus of the present invention include colored materials which discolor or fade by light receipt of ultraviolet radiation of wavelength in the range of at least 300 to 360 nm, preferably at least 300 to 330 nm, more preferably at least 300 to 320 nm and moreover wherein the discoloration or fading progresses in accordance with the receipt light quantity and degree of the discoloration or fading is distinguishable with the naked eye.

As such colored materials those which satisfy the above conditions and thus are comparatively liable to discolor or fade can be selected, for example, from the following colored materials and used:

various inorganic pigments; azo pigments such as insoluble monoazo pigments, insoluble disazo pigments, azo lake pigments, condensed azo pigments and metal complex salt azo pigments; phthalocyanine pigments such as copper phthalocyanine, copper halide phthalocyanine, nonmetal phthalocyanine and copper phthalocyanine lakes; dyeing lakes such as acid dye lakes and basic dye lakes; condensed polycyclic pigments such as anthraquinone series pigments, thioindigo pigments, perinone pigments, perylene pigments, quinacridone pigments, dioxazine pigments, isoindolinone pigments, quinophthalone pigments and isoindoline pigments; organic pigments such as nitroso pigments, alizarin lakes, metal complex salt azomethine pigments, Aniline Black, Alkali Blue, daylight fluorescent pigments and natural organic pigments; disperse dyes such as azo series disperse dyes, anthraquinone series disperse dyes, quinophthalone series disperse dyes, nitrodiphenylamine series disperse dyes and styryl series disperse dyes; cationic dyes such as conjugated cationic type azo dyes, nonconjugated cationic type azo dyes, styryl series cationic dyes, anthraquinone series cationic dyes, naphthostyryl series cationic dyes and coumarin series cationic dyes; reactive dyes such as vinylsulfone series reactive dyes, triazine series reactive dyes, pyrimidine series reactive dyes, dichloroquinoxaline series reactive dyes, phosphonic acid series reactive dyes, bromoacrylamide series reactive dyes, composite type reactive dyes and bifunctional group reactive dyes; synthetic coloring matters for foods such as those of azo series, xanthene series, triphenylmethane series, indigo series and the like; natural coloring materials for foods such as those of phycobilin series, porphyrin series, carotenoid series, flavonoid series, betain series, diketone series, flavin series, quinone series, azafirin series and like; etc. Test for the compatibility can easily be carried out by persons of ordinary skill in the field, for example, by exposing the colored material supported on a solid support to each of the following light beam irradiation conditions, i.e.

(A) light beam irradiation conditions containing ultraviolet radiation of wavelength in the range of at least 300 to 360 nm, preferably at least 300 to 330 nm, more preferably at least 300 to 320 nm: Specifically, artificial lights emitted from various light sources such as halogen lamps, fluorescent lamps, high pressure sodium lamps, metal halide lamps, mercury lamps and low pressure sodium lamps; natural light and the like may be used, (B) light beam irradiation condition wherein ultraviolet radiation in the wavelength range from the irradiation light of (A) was removed by various UV cut filters: Specifically, cutting of 400 nm or less, cutting of 330 nm or less and cutting of 320 nm or less and the like are suitable, (C) light beam irradiation condition chiefly containing ultraviolet radiation in the above wavelength range: Specifically, there can be mentioned artificial light emitted from light sources such as fluorescent lamp for health light beam (type: FL20S.E, Toshiba Denzai Co., Ltd.), fluorescent lamp for insect-catching instruments (type: FL20S.BL, Toshiba Denzai Co., Ltd.), black light fluorescent lamp (type: FL20S.BLB, Toshiba Denzai Co., Ltd.), black light blue fluorescent lamp (type: FL20S.BL-B, Matsushita Electric Industrial Co., Ltd.), fluorescent lamp for copy (type: FL20BA-37, Matsushita Electric Industrial Co., Ltd.), blue color fluorescent lamp (type: FL20S.B, Matsushita Electric Industrial Co., Ltd.) and purely blue colored fluorescent lamp (type: FL20S.B-F, Matsushita Electric Industrial Co., Ltd.);

measuring the color of the exposed part of the colored material with a color-difference meter with every certain irradiation quantity;

comparing the characteristic of received light beams and degree of discoloration or fading formed by the exposure with one another; and further investigating correlation with receipt light quantity.

It can be declared that colored materials advantageously used in the invention are colored materials which, according to this test method, exhibit no or only slight discoloration or fading under the (B) irradiation condition, but clearly discolor or fade under the (A) irradiation condition and, especially, remarkably discolor or fade under the (C) irradiation condition; and in which colored materials the degree progresses in accordance with the receipt light quantity.

Colored materials suitably usable in the invention among the above colored materials include the reactive dyes, and synthetic or natural coloring matters for foods, more specifically triazine series reactive dyes, and natural coloring matters for foods of phycobilin series, carotenoid series, flavonoid series or betain series.

Examples of the triazine series reactive dyes suitably used include Mikacion Brilliant Orange, etc., examples of the phycobilin series natural coloring matters for use in foods include phycoerythrin, phycocyanin, allophycocyanin, etc., suitable examples of the carotenoid series natural coloring matters for use in foods include crocin, etc., and suitable examples of the flavonoid series natural coloring matters for use in foods include shisonin, etc., and suitable examples of the betain series natural coloring matters for use in foods include betain, etc. Among them phycobilin series natural coloring matters for use in foods are preferred, and phycoerythrin, phycocyanin and allophycocyanin are particularly preferred. C-phycoerythrin, B-phycoerythrin, R-phycoerythrin, etc, are present as the above phycoerythrin, and B-phycoerythrin is particularly preferred. C-phycocyanin, B-phycocyanin, phycoerhthrocyanin and the like are present as phycocyanin, and C-phycocyanin is particularly preferred. Allophycocyanin B, allophycocyanin and the like are present as allophycocyanin, and allophycocyanin is particularly preferred. More typically, coloring matters extracted from algae, for example, phycobilin series coloring matters, especially phycoerythrin are suitable.

Particularly, in case of phycoerythrin extracted from cells of algal plants, when a specimen obtained by bearing crimson phycoerythrin coloring matter on a filter paper or the like by adsorption and drying it is irradiated with ultraviolet radiation having wave-length in the range of at least 300 to 360 nm and intensity of 10 $\mu w/cm^2$ or more, fading progresses in accordance with amount of the receipt light successively from crimson before the light receipt to colorless transparency via pink. Similarly, fading successively progresses in accordance with the amount of light receipt from blue to colorless transparency in case of phycocyanin, and from light blue to colorless transparency in case of allophycocyanin.

In the invention the above colored materials are used in the form of being supported on various solid supports. The supports include, for example, papers, filter papers, filters, fibers, woven fabrics, nonwoven fabrics, plant tissues, plant organs, natural macromolecules, synthetic macromolecules, resins, fats and oils, silica gel, alumina, glasses, titanium, metal, ceramics, plastics, etc., and preferred among them are papers, filter papers, filters, fibers, woven fabrics, nonwoven fabrics, silica gel, ceramics and plastics.

There can be used as a method whereby the colored material is supported on the solid support any usual method such as impregnation, filtration, immersion, adhesion, application, coating, printing, spraying, sealing, polymerization or casting.

Further, the above colored material can be molded into any desired shape such as a film-like, sheet-like, bead-like, capsule-shaped, button-shaped, doll-shaped or ornament-shaped shape, by mixing or kneading the colored material with jerry, agar, polyvinyl alcohol, polymethyl methacrylate, or a thermoplastic resin such as a vinyl acetate series resin or vinyl chloride series resin, and molding the resulting mixture. It is preferred to mold the mixture into a film-like or sheet-like shape.

Further, by adjusting the amount of the above colored material to be supported on the solid support or by suitably adding various additives such as an ultraviolet absorber and an antioxidant, it is possible to adjust the degree of discoloration or fading by receipt light of ultraviolet radiation to an optimum extent in compliance with its use.

The measurement apparatus of the present invention comprising the colored material supported on a solid support in such a manner as above can be used in a processed suitable form in compliance with its uses. For examples, the measurement apparatus of the invention can be utilized for avoiding excessive sunbathing by attaching it to a suitable part of human body and detecting quantity of the ultraviolet radiation received during sunbathing. The measurement apparatus of the invention can be processed into forms easily put on human body in manners known per se, and can for example be processed into various forms such as seals, emblems (wappens), labels, rings, bracelets, timepieces, necklaces, pendants, brooches, buttons, tapes, headbands, sun visors, sunglasses, hats and caps, hair ornaments, belts, toys, mascots, ornaments, parsols, carpets, glove compartments, bags, towels, indication plates and clothes. Preferred forms are seals, emblems, labels, bracelets, pendants, brooches, tapes, sun visors, sunglasses, hats and caps, hair ornaments, mascots and indication plates, and particularly preferred forms are seals, emblems, pendants, brooches, hair ornaments, mascots and indication plates and the like.

The shape of the light receipt part of the simplified apparatus for measurement of quantity of the receipt light of the ultraviolet radiation of the invention, namely the part where the colored material is supported on the solid support, is not particularly limited, and can be any one of various shapes such as circle, ellipses, polygons, quadrilaterals, triangles, symbol shapes, letter shapes and patterns. Further, the light receipt face may not be limited to plain and may have a cubic structure of the sphere, hemisphere, dome shape, semicylindrical shape, cone, pyramid, concave-shape or the like.

Further, in order to control the quantity of ultraviolet radiation having wavelength in the range of at least 300 to 360 nm and reaching the light receipt part, namely the part where the colored materials are supported on the solid support, it is also possible to use in front of the part various ultraviolet radiation transmission amount-controlling filters, light-reducing filters, colored filters, or nets such as lawn alone or in combination. Preferred among them are ultraviolet radiation transmission amount-controlling filters, light-reducing filters, colored filters and nets, and ultraviolet radiation transmission amount-controlling filters are particularly preferred.

Methods of measuring the quantity of receipt light of ultraviolet radiation having wavelength in the range of at least 200 to 360 nm by using the simplified apparatus for measurement of the amount of receipt light of ultraviolet radiation of the invention include, for example, (a) a method of detection of the receipt light amount of ultraviolet radiation by previously investigating, using the measurement apparatus of the invention, the relation of the receipt light quantity of ultraviolet radiation having wavelength in the range of 300 to 360 nm to be detected with the dissolved or faded color tone to prepare a color sample table of discoloration or fading color tone in accordance with the receipt light quantity, and then comparing the color sample table with the actual discoloration or fading color tone of the measurement apparatus used for the measurement, (b) a method which comprises superposing light receipt parts (parts where the colored material is supported on a solid support) prepared so as to fade to colorless transparency by comparatively low quantity of receipt light under the condition that their sizes or shapes (figure, symbol, letter, pattern or the like) are gradually changed, and then simply detecting the receipt light amount from their sizes or shapes, (c) a method which comprises previously making printing of an image such as figure, symbol, letter or pattern on the underpart of the light receipt part so that the image, which cannot be seen at all before fading of the light receipt part, reveals itself as the fading progresses at the light receipt part in accordance with the receipt light quantity, and then simply detecting the receipt light amount based on the presence or absence of appearance of the image, (d) a method which comprises lining up light receipt parts prepared so as to completely discolor or fade at previously phased receipt light quantities, respectively, and then simply detecting the receipt light quantity based on the presence or absence of these discolorations or fadings, and (e) a method comprising a combination of these methods.

However, the methods therefor are not limited to the above methods, and any method is included in the scope of the invention so long as it is a method utilizing or applying the phenomenon that the simplified apparatus for measurement of receipt light quantity of ultraviolet radiation discolors or fades by light receipt of ultraviolet radiation having wavelength in the range of at least 300 to 360 nm in accordance with the receipt light quantity.

Thus, by use of the measurement apparatus of the invention, it is possible to simply detect receipt light quantity of ultraviolet radiation which is contained in natural light (sunlight), artificial light or the like, and has an irradiation intensity of at least 0.1 $\mu w/cm^2$, preferably 1 $\mu w/cm^2$ or more, more preferably 10 $\mu w/cm^2$ or more, still more preferably 100 $\mu w/cm^2$ or more and wavelength in the range of 300 to 360 nm.

The above-described apparatus of the present invention has various excellent advantages, for example, that receipt light quantity of ultraviolet radiation of narrow wavelength region of 300 to 360 nm can be measured as an integrated value in high accuracy, an intermittent measurement is also possible, measurement can simply be carried out without by preliminary procedure or special procedure by anyone without any skill, any expensive measurement apparatus or the like is not separately required, receipt light quantity can be detected by color, receipt light quantity can constantly be grasped, the apparatus is light and compact and thus excellent in conveyance, measurement can be carried out without any influence by measurement spot and the atmospheric phenomenon conditions at the measurement, the apparatus can be used as a throwaway article, and the apparatus is very cheap.

PREFERRED EMBODIMENT FOR CARRYING OUT THE INVENTION

The present invention is further specifically described by the following examples and comparative examples.

EXAMPLES 1 TO 7, AND COMPARATIVE EXAMPLES 1 TO 9

A filter paper for chromatography, No. 514 produced by Toyo Roshi Co., Ltd. (40 cm × 40 cm) was cut into plural square papers having a side length of 12 cm. Then, 1 g of the various natural and synthesized colored materials listed in Table-1 were well dissolved, in case of powder, in 10 ml of distilled water, respectively, and then the resulting solutions were poured and spread in stainless trays 16.5 cm longitudinal × 21 cm horizontal, respectively. On the other hand, 10 ml of the colored materials, in case of original solution, were poured and spread without dilution in the trays, respectively. Then, the above cut filter papers were immersed therein so that the surface of the filter papers looked down, allowed to fully absorb the colored materials, and dried at room temperature overnight, respectively. After drying, the edge of each filter paper was cut off by a width of 1 cm, and the remaining part was cut into strips 2 cm horizontal × 10 cm longitudinal. The thus prepared colored material-adsorbed filter papers were placed under the light receipt conditions of the various light indicated in Table-2 and FIG. 2 for exposure to light. Exposure to light was carried out by covering the colored material-adsorbed filter papers with light-shielding films and moving the light-shielding films by the rate of 2 cm at every one hour for at most 4 hours. Thus, in the state when exposure to light was completed, the 4 hours-exposed, 3 hours-exposed, 2 hours-exposed, 1 hour-exposed and nonexposed parts were lined up in this order from the edge at an interval of a width of 2 cm. The color of each exposed part and nonexposed part was measured by a color-difference meter, MACBETH MS 2020 (produced by MACBETH Co., Ltd.), and color difference $\Delta E$ of the C.I.E. system of from 1 hour to 4 hours after exposure to light was measured. The results are indicated in Table-3.

As apparent from the results of Table-3, Examples 1 to 7 exhibit extremely stronger discoloration and fading under light receipt of light containing ultraviolet radiation of at least 300 to 320 nm such as positive lamp, SE light or BL-B light than under light receipt of light of positive lamp which does not contain the wavelength namely from which light of 330 nm or less is cut and from which light of 380 nm or less is cut. Furthermore, degree of the discoloration and fading increases in accordance with light receipt time (=receipt light quantity).

On the other hand, in the comparative examples, there are those such as Comparative Examples 1 and 2 which exhibit strong fading regardless of the kind of light of light receipt; those such as Comparative Examples 3, 5, 6 and 7 which exhibit almost no discoloration and fading regardless of the kind of light of light receipt; and those as Comparative Examples 4, 8 and 9 which exhibit stronger discoloration or fading, contrary to Examples 1 to 7, under light receipt of positive lamp lights of 330 nm or less cut and 380 nm or less cut compared to SE light and BL-B light; and the like, and thus various changes by light received of various lights are seen based on kind of the colored materials. It is seen from the above matters that Examples 1 to 7 are, different from other colored materials, those wherein unique colored materials are supported on solid supports which materials discolor or fade by application of ultraviolet radiation of at least 300 to 320 nm in accordance with the amount of receipt light.

Figure 2:
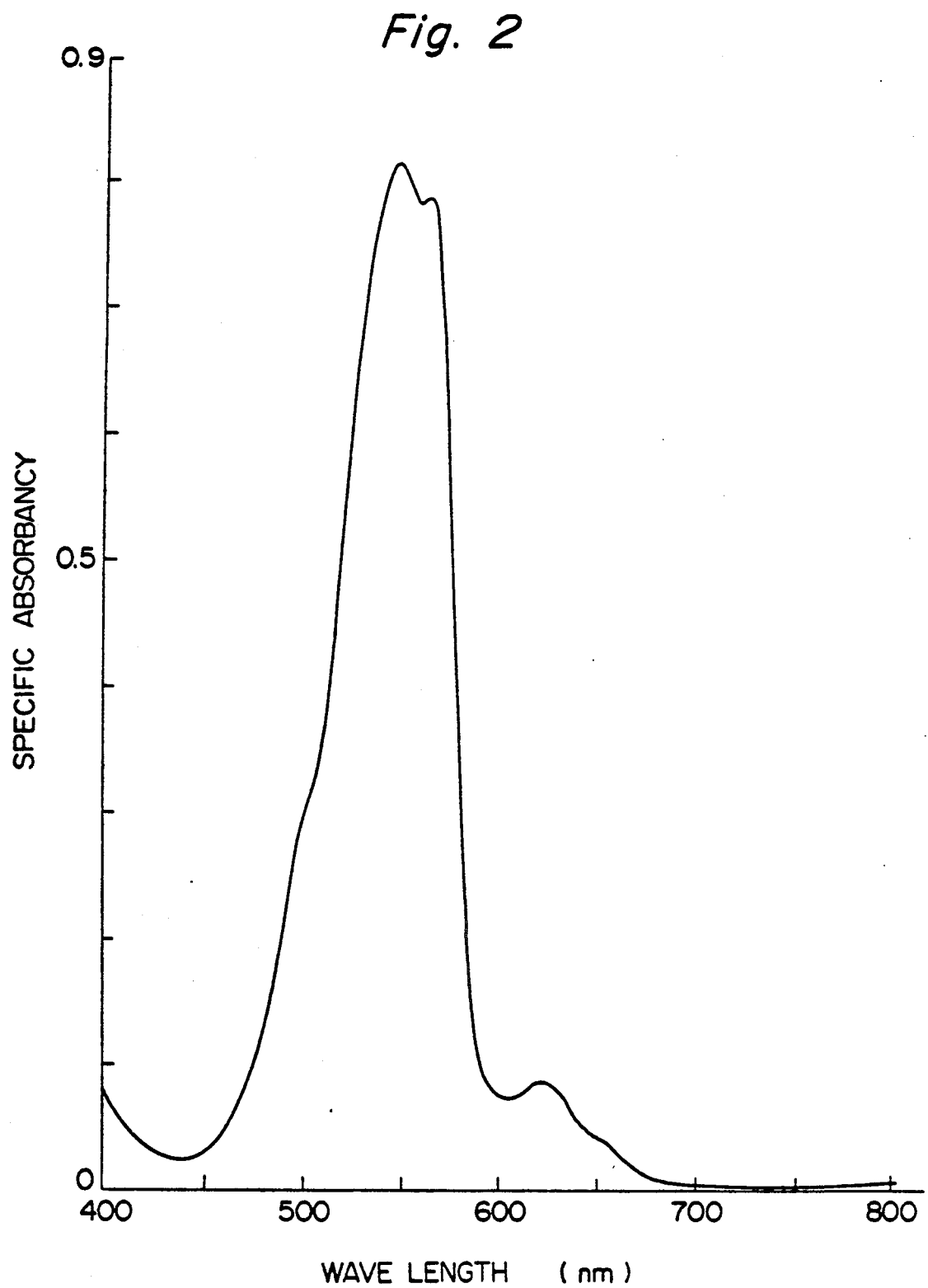
FIG. 2 is an absorbency distribution drawing of crude B-phycoerythrin as a colored material used in the apparatus of the present invention.

Phycoerythrin of Example 1 was obtained as follows. That is, *Porphylidium cruentum*, a red alga was cultured in the medium indicated in Table-4 for 7 days while the temperature was maintained at 28° C. and air containing 3% carbon dioxide added was continuously supplied by bubbling. The proliferated alga cells were centrifuged and suspended in the potassium phosphate buffer solution (pH 6.7) indicated in Table-5, and the membrane of the alga cells were destroyed by an ultrasonic cell-destroying machine and the destroyed alga cell membranes were centrifuged. Ammonium sulfate was added to the resulting supernatant to its concentration of 30% for salting out, and the precipitated crude B-phycoerythrin was centrifuged. The resulting phosphate buffer solution (pH 6.7) indicated in Table-5 and fully dialysed against the liquid of Table-2 which was placed in a cellulose tube and diluted 100 times to obtain an aqueous 0.54% solution of crude B-phycoerythrin. The absorbance characteristic of the obtained crude B-phycoerythrin solution is shown in FIG. 2.

This absorbency characteristic coincided with that of the B-phycoerythrin disclosed in a literature (Chemistry and Biochemistry of Plant Pigments, Edited by T. W. Goodwin, Volume 1, pp. 328 to 350).

TABLE 1

| Section | Colored material | Classification (natural, synthesized) | Trade name/Maker | Appearance |
|---|---|---|---|---|
| Example | | | | |
| 1 | Phycoerythrin | Phycobilin series (natural) | Nippon Carbide Industries Co., Inc. | Solution |
| 2 | Phycocyanin | Phycobilin series (natural) | Nippon Carbide Industries Co., Inc. | " |
| 3 | Allophycocyanin | Phycobilin series (natural) | Nippon Carbide Industries Co., Inc. | " |
| 4 | Crocin | Carotenoid series (natural) | KUCHINASHIN <72>/ Taito Co., Ltd. | Powder |
| 5 | Shisonin | Flavonoid series (natural) | Red 10A/Soda Koryo Co., Ltd. | Solution |
| 6 | Betanin | Betain series (natural) | BEETRED/Takasago Corporation | Powder |
| 7 | Triazine series reactive dye | Reactive dye (synthesized) | Mikacion Brilliant Orange 2RS/Nippon Kayaku Co., Ltd. | " |
| Comparative Example | | | | |
| 1 | β-Carotene | Carotenoid series (natural) | β-carotene preparation/ Takasago Corporation | Powder |

TABLE 1-continued

| Section | Colored material | Classification (natural, synthesized) | Trade name/Maker | Appearance |
|---|---|---|---|---|
| 2 | Capsanthin | Carotenoid series (natural) | Red 5c/Soda Koryo Co., Ltd. | " |
| 3 | Gardenia blue dye | Carotenoid series (natural) | Blue 1AH/Soda Koryo Co., Ltd. | Solution |
| 4 | Bixin | Carotenoid series (natural) | Red 6c/Soda Koryo Co., Ltd. | " |
| 5 | Polyphenol | Flavonoid series (natural) | Brown N/Soda Koryo Co., Ltd. | Powder |
| 6 | Anthocyanin | Flavonoid series (natural) | Red 12A/Soda Koryo Co., Ltd. | Solution |
| 7 | Rubro-burassicin | Flavonoid series (natural) | Red 13A/Soda Koryo Co., Ltd. | " |
| 8 | Red No. 104 | Xanthene series (synthesized) | Red No. 104/AIZEN K.K. | Powder |
| 9 | Red No. 106 | Xanthene series (synthesized) | Red No. 106/AIZEN K.K. | " |

TABLE 2

| Irradiation light | Light beam | Filter | Irradiation light wavelength (nm) | Rate of ultraviolet radiation 300–320 nm | Rate of ultraviolet radiation 300–330 nm | Rate of ultraviolet radiation 300–360 nm | Irradiation intensity (mW/cm²) Visual light | Irradiation intensity (mW/cm²) Ultraviolet light (measurement apparatus) | Temperature (°C.) |
|---|---|---|---|---|---|---|---|---|---|
| Positive lamp | Positive lamp D400 Toshiba Denzai Co., | — | 300–800 or more | 0.6% | 1.0% | 3.6% | 90 | 3.2 (UVR-365) | 28–30° C. |
| 380 nm or less cut positive lamp | As above | Near ultraviolet radiation cut agricultural vinyl film "Hi-S VINYL" (thickness: 120 μm) Nippon Carbide Industries Co., Inc. | 380–800 or more | — | — | — | 90 | 0 (UVR-365) | 28° C. |
| BL-B | Black light blue lamp FL20S-BL-B Matsushita Electric Industrial Co., Ltd. | — | 300–430 | 3.3% | 9.2% | 64% | 0.03 | 3.2 (UVR-365) (1.0 (65A Radiometer) | 28° C. |
| SE | Fluorescent lamp for health beam FL20S E Matsushita Electric Industrial Co., Ltd. | — | 280–360 | 56% | 67% | 74% | 0.35 (bright line) | 1.0 (65A Radiometer) | 28° C. |

TABLE 3

| Section | Colored material | Discoloration or fading | Light of positive lamp 1 H | 2 H | 3 H | 4 H | 380 nm or less cut positive lamp light 1 H | 2 H | 3 H | 4 H | SE light 1 H | 2 H | 3 H | 4 H | BL-B light 1 H | 2 H | 3 H | 4 H |
|---|---|---|---|---|---|---|---|---|---|---|---|---|---|---|---|---|---|---|
| Example | | | | | | | | | | | | | | | | | | |
| 1 | Phycoerythrin | fading | 11.3 | 18.5 | 21.1 | 23.8 | 3.8 | 5.5 | 7.1 | 8.6 | 22.1 | 29.9 | 34.8 | 38.9 | 7.2 | 11.5 | 14.8 | 17.3 |
| 2 | Phycocyanin | fading | 7.6 | 10.7 | 12.6 | 15.1 | 2.3 | 3.5 | 4.0 | 5.2 | 11.0 | 16.0 | 18.8 | 21.7 | 6.8 | 10.0 | 12.0 | 13.3 |
| 3 | Allophycocyanin | fading | 7.3 | 12.2 | 14.4 | 16.2 | 2.0 | 3.0 | 3.7 | 4.0 | 12.0 | 15.1 | 16.8 | 18.6 | 6.6 | 10.1 | 12.1 | 13.7 |
| 4 | Crocin | fading | 1.3 | 2.7 | 3.8 | 5.1 | 0.2 | 0.7 | 1.0 | 1.2 | 0.9 | 2.2 | 3.2 | 4.5 | 0.4 | 0.9 | 1.4 | 1.6 |
| 5 | Shisonin | fading | 1.2 | 1.4 | 2.0 | 2.3 | 0.2 | 0.2 | 0.6 | 0.9 | 1.2 | 1.6 | 2.1 | 2.4 | 1.0 | 1.5 | 1.8 | 2.3 |
| 6 | Betanin | fading | 1.5 | 3.2 | 4.3 | 5.8 | 1.1 | 1.8 | 2.2 | 3.0 | 1.6 | 2.7 | 3.5 | 4.6 | 0.9 | 1.1 | 1.4 | 1.6 |
| 7 | Triazine series reactive dye | discoloration | 1.0 | 2.7 | 3.9 | 4.8 | 0.8 | 0.9 | 1.4 | 1.5 | 1.3 | 2.2 | 3.3 | 3.5 | 1.6 | 2.6 | 3.8 | 4.3 |
| Comparative Example | | | | | | | | | | | | | | | | | | |

TABLE 3-continued

| Section | Colored material | Discoloration or fading | Time lapse change by receipt light (ΔE) | | | | | | | | | | | | | | | |
|---|---|---|---|---|---|---|---|---|---|---|---|---|---|---|---|---|---|---|
| | | | Light of positive lamp | | | | 380 nm or less cut positive lamp light | | | | SE light | | | | BL-B light | | | |
| | | | 1 H | 2 H | 3 H | 4 H | 1 H | 2 H | 3 H | 4 H | 1 H | 2 H | 3 H | 4 H | 1 H | 2 H | 3 H | 4 H |
| 1 | β-carotene | fading | 42.7 | 47.1 | 49.4 | 49.9 | 39.1 | 44.3 | 45.9 | 46.9 | 38.2 | 43.0 | 43.7 | 45.0 | 33.3 | 43.5 | 45.6 | 47.1 |
| 2 | Capsanthin | fading | 40.3 | 41.0 | 41.9 | 41.8 | 34.6 | 37.7 | 39.0 | 39.1 | 37.2 | 38.7 | 39.8 | 40.1 | 36.9 | 38.0 | 39.1 | 39.7 |
| 3 | Gardenia blue dye | — | 0.3 | 0.3 | 0.3 | 0.3 | 0 | 0.2 | 0.1 | 0.1 | 0 | 0.2 | 0.1 | 0.3 | 0.2 | 0.1 | 0.1 | 0.2 |
| 4 | Bixin | fading | 3.2 | 4.6 | 4.7 | 4.7 | 2.0 | 2.0 | 2.3 | 2.3 | 0.8 | 0.9 | 1.0 | 1.0 | 3.0 | 3.4 | 3.3 | 3.7 |
| 5 | Polyphenol | — | 0.2 | 0.8 | 0.9 | 1.5 | | | | | 0.1 | 0.6 | 0.6 | 0.7 | 0.1 | 0.8 | 0.8 | 1.0 |
| 6 | Anthocyanin | — | 0.6 | 1.0 | 1.0 | 1.2 | | | | | 0.2 | 0.4 | 0.4 | 1.0 | 0.2 | 0.2 | 0.2 | 0.3 |
| 7 | Rubroburasisicin | — | 0.4 | 0.7 | 1.0 | 1.0 | 0.1 | 0.2 | 0.7 | 0.7 | 0.3 | 0.6 | 0.9 | 0.9 | 0.2 | 0.2 | 0.4 | 0.8 |
| 8 | Red No. 104 | discoloration | 3.2 | 5.0 | 5.9 | 7.0 | 2.7 | 3.5 | 3.7 | 4.5 | 0.1 | 0.4 | 0.5 | 0.6 | 1.0 | 1.3 | 1.6 | 1.7 |
| 9 | Red No. 106 | discoloration | 3.6 | 10.2 | 16.6 | 22.0 | 2.3 | 5.4 | 9.3 | 14.0 | 1.0 | 1.2 | 1.9 | 3.6 | 0.7 | 0.9 | 1.0 | 2.1 |

TABLE 4

| Composition | Amount to be added (/l) |
|---|---|
| NaCl | 29.22 g |
| $MgCl_2.6H_2O$ | 1.5 g |
| $MgSO_4.7H_2O$ | 0.5 g |
| KCl | 0.2 g |
| $CaCl_2$ | 0.2 g |
| $KNO_3$ | 1.0 g |
| Tris | 2.45 g |
| $K_2HPO_4$ | 0.045 g |
| EDTA.2Na | 5.5 mg |
| $ZnSO_4.7H_2O$ | 0.087 mg |
| $H_3BO_3$ | 0.61 mg |
| $CoCl_2.6H_2O$ | 0.015 mg |
| $CuSO_4.5H_2O$ | 0.06 mg |
| $MnCl_2$ | 0.23 mg |
| $(NH_4)_6Mo_7O_{24}.4H_2O$ | 0.38 mg |

TABLE 5

| Composition | Amount to be added (M) |
|---|---|
| $KH_2PO_4$ | 0.1 |
| $K_2HPO_4$ | 0.1 |
| NaCl | 0.2 |

Phycocyanin and allophycocyanin of Examples 2 and 3 were obtained as follows. That is, to dried alga body of Spirulina, a blue-green alga was added a potassium phosphate buffer solution (Table-5, pH 6.7) of 10 times the volume of the alga body to form a suspension. The suspension was subjected to freezing-thawing treatment three times, and subjected to centrifugation to obtain a supernatant. Ammonium sulfate was added to this supernatant so that the concentration became 50% or 65% to obtain a salting out product of crude C-phycocyanin or crude allophycocyanin. This salting out product was fully dialyzed in the same manner as in phycoerythrin to obtain an aqueous crude C-phycocyanin or crude allophycocyanin solution.

"Rate of ultraviolet radiation" in Table-2 was obtained by calculating the rate of the area of the concerned wavelength range to the total area of each irradiation light based on the catalogue and spectral distribution figure obtained from Toshiba Denzai Co., Ltd. and Matsushita Electric Industrial Co., Ltd. Receipt light intensity of visible light and ultraviolet right was measured using the following measuring apparatus:

Visible light:
  Spectra photometer/Radiometer Model Type 301, produced by Photoresearch Co., Ltd.
Ultraviolet light:
  ① Ultraviolet radiation intensity-measuring apparatus UVR-365 type, Tokyo Kogaku Kikai Co., Ltd.
  ② Model 65A Radiometer, produced by YSI-Kettering Co.

EXAMPLES 8 AND 9, AND COMPARATIVE EXAMPLES 10 AND 11

Two sheets of each of phycoerythrin-adsorbing filter paper and phycocyanin-adsorbing filter paper were prepared in the same manner as in Examples 1 to 7, and each one of them was covered with 380 nm or less cut film (agricultural vinyl film from which near ultraviolet radiation was removed, "Hi-S VINYL", produced by Nippon Carbide Industries Co., Inc.) (Comparative Examples 10 and 11).

These colored material-adsorbed filter papers were set on an outdoor stand for exposure to light in Uozu Research Installation of Nippon Carbide Industries Co., Inc. at 751 Honshin, Uozu-shi, Toyama-ken for 10:00 am of April 25 to 2:00 pm, exposed to natural light while covering the filter papers with light-shielding films and moving the light-shielding films by the rate of 2 cm at every one hour for at most 4 hours, in the same manner as in Examples 1 to 7. The color of the exposed part and nonexposed part of each of them was measured by a color-difference meter whereby the color difference ΔE of C.I.E. system was measured from 1 hour to 4 hours after the exposure to light. The results are shown in Table-6. Further, weather, light beam intensity and temperature (of the face of the stand for exposure to light) at every one hour on that day are shown in Table-7.

As apparent from the result of Table-6, in Examples 8 and 9 wherein the filter papers were exposed to natural light containing ultraviolet radiation of at least 300 to 320 nm, the filter papers exhibit remarkable fading and further degree of the fading increases in accordance with exposure time (=quantity of the exposing light).

However, in Comparative Examples 10 and 11 wherein the filter papers were exposed to natural light from which all ultraviolet radiations of 380 nm or less were removed, there are only very little fading and only extremely small increase of degree of the fading in accordance with exposure time.

ence meter to measure color difference ΔE of C.I.E. system. The results are shown in Table-8.

TABLE 8

| Section | Receipt light intensity (mW/cm$^2$) | Colored material | Color difference ΔE at every exposure time | | | | | | | |
|---|---|---|---|---|---|---|---|---|---|---|
| | | | 1 hour | 2 hours | 3 hours | 4 hours | 5 hours | 6 hours | 7 hours | 8 hours |
| Example | | | | | | | | | | |
| 10 | 1.0 | Phyco-erythrin | 22 | 29 | 34 | 38 | — | — | — | — |
| 11 | 0.1 | Phyco-erythrin | — | 1.9 | — | 3.5 | — | 5.0 | — | 6.4 |
| 12 | 0.04 | Phyco-erythrin | — | 0.7 | — | 1.0 | — | 1.2 | — | 1.5 |
| 13 | 1.0 | Phyco-cyanin | 11.1 | 15.4 | 18.1 | 21.5 | — | — | — | — |
| 14 | 0.1 | Phyco-cyanin | — | 0.8 | — | 1.7 | — | 2.1 | — | 2.9 |

TABLE 6

| Section | Kind of receipt light | Colored material | Color difference ΔE at every exposure time | | | |
|---|---|---|---|---|---|---|
| | | | 1 hour | 2 hours | 3 hours | 4 hours |
| Example | | | | | | |
| 8 | Natural light | Phyco-erythrin | 13.4 | 20.2 | 27.2 | 33.0 |
| 9 | Natural light | Phyco-cyanin | 8.7 | 13.3 | 17.5 | 19.2 |
| Comparative Example | | | | | | |
| 10 | 380 nm or less cut natural light | Phyco-erythrin | 3.9 | 5.2 | 6.8 | 7.9 |
| 11 | 380 nm or less cut natural light | Phyco-cyanin | 1.6 | 2.3 | 2.9 | 3.1 |

TABLE 7

| Item | | Time | | | |
|---|---|---|---|---|---|
| | | 10.00–11.00 | 11.00–12.00 | 12.00–13.00 | 13.00–14.00 |
| Weather | | fine | very fine | very fine | fine |
| Intensity (mW/cm$^2$) | Visible light beam | 27→45 | 45→52 | 52→44 | 44→18 |
| | Ultraviolet radiation | 4.1→4.3 | 4.3 | 4.3→4.0 | 4.0→3.0 |
| Temperature (°C.) | | 24–26 | 28–29 | 29 | 29 |

EXAMPLES 10 TO 14

Three sheets of each of phycoerythrin-adsorbed filter paper and phycocyanin-adsorbed filter paper were prepared in the same manner as in Examples 1 to 7, and each one of the papers was placed under the light condition that SE light was applied at the intensity of 1.0, 0.1 and 0.04 mW/cm$^2$ (measuring apparatus: Model 65A Radiometer). Exposure to light was carried out, while the filter papers were covered with light shielding films respectively in the same manner as in Examples 1 to 7, by moving the filter papers by the rate of 2 cm at every one hour under the light receipt condition of an intensity of 1.0 mW/cm$^2$ and by the rate of 2 cm at every two hours under the light receipt condition of an intensity of 0.1 and 0.04 mW/cm$^2$. The color of these exposed parts and nonexposed parts was measured by a color-difference meter to measure color difference ΔE of C.I.E. system. The results are shown in Table-8.

As apparent from the results of Table-8, it is seen that phycoerythrin exhibits fading reaction even to faint SE light having a receipt light intensity of 0.04 mW/cm$^2$ and thus can be used even for measurement of receipt light quantity of the faint light. Similarly, it is seen that phycocyanin can be used for measurement of receipt light quantity of light having a receipt light intensity stronger than 0.04 mW/cm$^2$.

EXAMPLES 15 AND 16, COMPARATIVE EXAMPLES 13 AND 14, AND REFERENCE EXAMPLE 1

A glass filter (produced by Toyo Filter, GB100R, diameter 55 mm) was set in a suction filtration apparatus, and 200 ml of a solution of 150 ppm crude B-phycoerythrin was subjected to suction filtration. After the filtration, the glass filter part was taken out and dried, and a transparent adhesive film (produced by Taiwan Chikyu Co., trade name: OPP) was adhered and adequately pressed down to the surface of this filter. Thereafter, the adhered filter was peeled little by little from the back surface to make the state that only the most outer layer to which a large quantity of dye was adsorbed was adhered to the film.

The thus prepared pale reddish purple phycoerythrin-adsorbed film was stuck on a previously prepared thick white cloth. This white cloth had two square holes which have a side of 5 cm and are opened side by side, and specifically, the phycoerythrin-adsorbed film was stuck on the white cloth immediately over the two holes. This hole-opened white cloth was placed on the abdominal region of a subject (male) in bathing outfit, and set so that the two holes came on the right and left symmetrical positions to the line which connects the center of the both shoulders of the subject with the navel and sunlight was applied to the phycoerythrin-adsorbed films similarly to the hole parts. The abdominal region other than the hole parts was covered with the white cloth to shield sunlight. Sunbathing test was carried out in this manner from 11:00 am on August 9 at Ishidahama sea bathing place of Ichida, Kurobe-shi, Toyama-ken. It was fine in weather at that day, but sometimes a cloud shielded the sun. At about one hour after start of the sunbathing the phycocyanin-adsorbed films changed color to pale pink (Example 15), and thus one hole (right side) was shielded by covering it with a white cloth and sunbathing was further continued. Since the phycoerythrin-adsorbed film changed color to white at about one hour and 30 minutes after start of the sunbathing (Comparative Example 13), the other hole (left side) was also shielded with a white cloth to complete the sunbathing. The color (L*, a* and b*, and that by the naked eye) of the phycoerythrin-adsorbed film at that time and the condition of the skin of the holes at the next day were shown in Table-9.

EXAMPLES 17 AND 18

A white adhesive film ("Hi-S CAL 5010", Nippon Carbide Industries Co., Inc.) was subjected to screen process printing with a white ink (Sericoal VKT611,

TABLE 9

| Section | Sunbathing time | Tested hole | Color of the phycoerythrin-adsorbed film | | | | Condition of the skin at the next day |
|---|---|---|---|---|---|---|---|
| | | | L* | a* | b* | Naked eye | |
| Reference Example 1 | 0 | — | 86.3 | 9.2 | −6.9 | pale reddish purple | — |
| Example 15 | about 1 hour | right side | 91.2 | 4.5 | −1.8 | pale pink | normal |
| Comparative Example 13 | about 1 hour and 30 minutes | left side | 95.4 | 1.5 | −1.3 | white | erythema |

That is, when the sunbathing was stopped at the point of time when the phycoerythrin-adsorbed films changed color form pale reddish purple to pale pink the skin was in the normal condition at the next day, but when the sunbathing was stopped at the point of time when the films changed color to white erythema was formed on the skin at the next day. Therefore, it was revealed that sunbathing until the point of time when the phycoerythrin-adsorbed films changed color to pale pink does not cause any erythema on the skin and sunbathing until the point of time when the films changed color to white causes erythema. Then, sunbathing test similar to that in the previous time was carried out using the identical subject at the same Ishidahama sea bathing place as in the previous time from 11:00 am of August 15, 6 days thereafter. An abdominal region which does not receive sunlight in the previous test and is located in the slightly copper side compared to the previous time was used for the test, and combination of the holes and time of the sunbathing was made converse. It was fine sometimes cloudy at that day, and the phycoerythrin-adsorbed films changed color to pale pink one hour and 30 minutes after start of the sunbathing (Example 16), one hole (left side) was shielded by covering it with a white cloth and sunbathing was further continued. As about 2 hours and 15 minutes after start of the sunbathing the phycoerythrin-adsorbed film changed color to white (Comparative Example 14), the other hole (right side) was shielded with a white cloth to complete the sunbathing. The test results at that time are shown in Table-10.

TABLE 10

| Section | Sunbathing time | Tested hole | Color of phycoerythrin-adsorbed film | Condition of the skin at the next day |
|---|---|---|---|---|
| Example 16 | about 1 hour and 30 minutes | left side | pale pink | normal |
| Comparative Example 14 | about 2 hours and 15 minutes | right side | white | erythema |

As apparent from Table-10, the skin of this subject is in a normal condition so far as fading of the phycoerythrin-adsorbed film is up to pale pink regardless of weather, and when the fading progresses up to white erythema forms. Therefore, it is possible for this subject to enjoy sunbathing while keeping the normal skin condition without forming any erythema so long as he takes care of sunbathing to the extent that the phycoerythrin-adsorbed film changes color to pale pink.

white, Teikoku Ink Co., Ltd.), and dried at 90° C. for 30 minutes to obtain a primary printing film. Then, an ink for screen process printing indicated in Table-11 was prepared, 6 ml of an aqueous 2.52% solution of the above crude B-phycoerythrin was added thereto, and after adequate stirring the mixture was defoamed in a stirring-deforming apparatus. The primary printing film was subjected to screen process printing (mesh size: 180 mesh) using this ink and dried at room temperature. After drying, the film was cut into two strips of 2 cm horizontal × 10 cm longitudinal, and the strips were exposed to the same positive lamp (Example 17) and SE light (Example 18) as used in Examples 1 to 7. The exposure to light was carried out in the same manner as in Examples 1 to 7, and the color of the exposed part and nonexposed part was measured by a color-difference meter to measure color difference E of C.I.E. system. The results are shown in Table-12.

As apparent from the results of Table-12, the films of Examples 17 and 18 exhibit remarkable fading by a light containing ultraviolet radiation of at least 300 to 320 nm and moreover degree of the fading increases in accordance with light receipt time (=receipt light quantity) of the light.

TABLE 11

| Composition ("trade name" maker) | Addition quantity |
|---|---|
| Acrylic emulsion ("NIKASOL RX533-L" Nippon Carbide Industries Co., Inc.) | 40 g |
| Ethyl alcohol | 4 g |
| Leveling agent ("POLYFLOW-S", Kyoei-Sha Yushikagaku Kogyo Co., Ltd.) | 400 mg |
| Thickner ("ADEKANOL UH-420", Asahi Denka Kogyo K.K.) | 500 mg |
| Antifoaming agent ("NOPCO NDW", SAN NOPCO K.K.) | 400 mg |

TABLE 12

| Section | Irradiation light | Color difference ΔE at every exposure time | | | |
|---|---|---|---|---|---|
| | | 1 hour | 2 hours | 3 hours | 4 hours |
| Example 17 | positive lamp | 8.8 | 13.3 | 16.1 | 18.4 |
| 17 | SE | 8.9 | 13.8 | 17.2 | 19.8 |

EXAMPLES 19 TO 21

Modified polyvinyl alcohol (7.5 g) (produced by The Nippon Synthetic Chemical Industry Co., Ltd., trade name: GOHSERAN L1-3266) and 7.5 g of polyvinyl alcohol (produced by Kuraray Co., Ltd., trade name:

POVAL PVA-205) were previously dissolved in 30 ml of distilled water, 3 drops of an antifoaming agent (produced by Shinetsu Chemical Co., Ltd., trade name: SHINETSU Silicone KS 496A) was added thereto, 7 ml of an aqueous 0.54% solution of the above crude B-phycoerythrin was added and the mixture was fully stirred. After the mixture was defoamed in a stirring-defoaming apparatus (produced by Daiwa Seiki Co., Ltd., trade name: KD-5 type stirring-defoaming apparatus), the mixture was cast on a polyethylene terephthalate film, which was stuck on a glass plate with a cellophane tape, using an applicator which was adjusted so that the cast film could have a thickness of 100 m. The cast mixture was dried in a dryer of 20° C. overnight to obtain a reddish purple transparent film having an average thickness of about 200 μm. This film was cut into rectangular film strips of 40 mm longitudinal × 15 mm horizontal. One sheet of the film strips (Example 19), two sheets of the film strips which were superposed (Example 20) and three sheets of the film strips which were superposed with one another (Example 21) were respectively stuck on three windows among the four windows for photometric path of a 4-cells chargeable cell holder (capable of dismantlement from the main body) of a spectrophotometer (produced by Shimadzu Corporation, trade name: Shimadzu Double Beam Spectrophotometer UV-180). This 4-cells chargeable cell holder was placed under application of visible radiation having an intensity of 90 mW/cm$^2$ (measurement apparatus: Spectra Photometer/Radiometer Model 301 type produced by Photo-Research Co.) and ultraviolet radiation having an intensity of 12 mW/cm$^2$ (measurement apparatus: Ultraviolet Radiation Intensity-Measuring Apparatus UVR-365 Type produced by Tokyo Optical Co., Ltd.) from HL-Neohalide Lamp 400 W Lamp (produced by Toshiba Denzai Co., Ltd., type and name: M400.L-J/BU) so that the film side faced on the illumination. The film strips and the 4-cells chargeable cell holder were cooled with wind of an electric fun from skerm upward direction. The films were irradiated (received light) under the artificial illumination for 30 hours, while, every 5 hours, the whole 4-cells chargeable cell holder was set in the sample room of the spectrophotometer and the light transmittance of each film strip at a wavelength of 550 nm was measured. The measurement was carried out with the contrast photometric path of air blank. The results are shown in Table-13 and FIG. 3.

Judgment of color of the films was carried out by observation of color of light transmitting the films with the naked eye.

TABLE 13

| Time | Example 19 Transmittance | Example 19 Color of the film | Example 20 Transmittance | Example 20 Color of the film | Example 21 Transmittance | Example 21 Color the film |
|---|---|---|---|---|---|---|
| Before light receipt | 7.5% | reddish purple | 1.1% | deep reddish purple | 0.1% | deep reddish purple |
| 5 hours | 16.3% | pale reddish purple | 5.0% | reddish purple | 0.6% | deep reddish purple |
| 10 hours | 25.4% | pink | 8.3% | reddish purple | 1.6% | deep reddish purple |
| 15 hours | 32.6% | pale pink | 12.0% | reddish purple | 2.8% | deep reddish purple |
| 20 hours | 38.5% | very slightly pink | 15.1% | pale reddish purple | 3.8% | deep reddish purple |
| 25 hours | 39.4% | transparent (slightly white turbid) | 17.6% | pale reddish purple | 5.0% | reddish purple |
| 30 hours | 41.0% | transparent (slightly white turbid) | 20.2% | pink | 5.9% | reddish purple |

Figure 3:
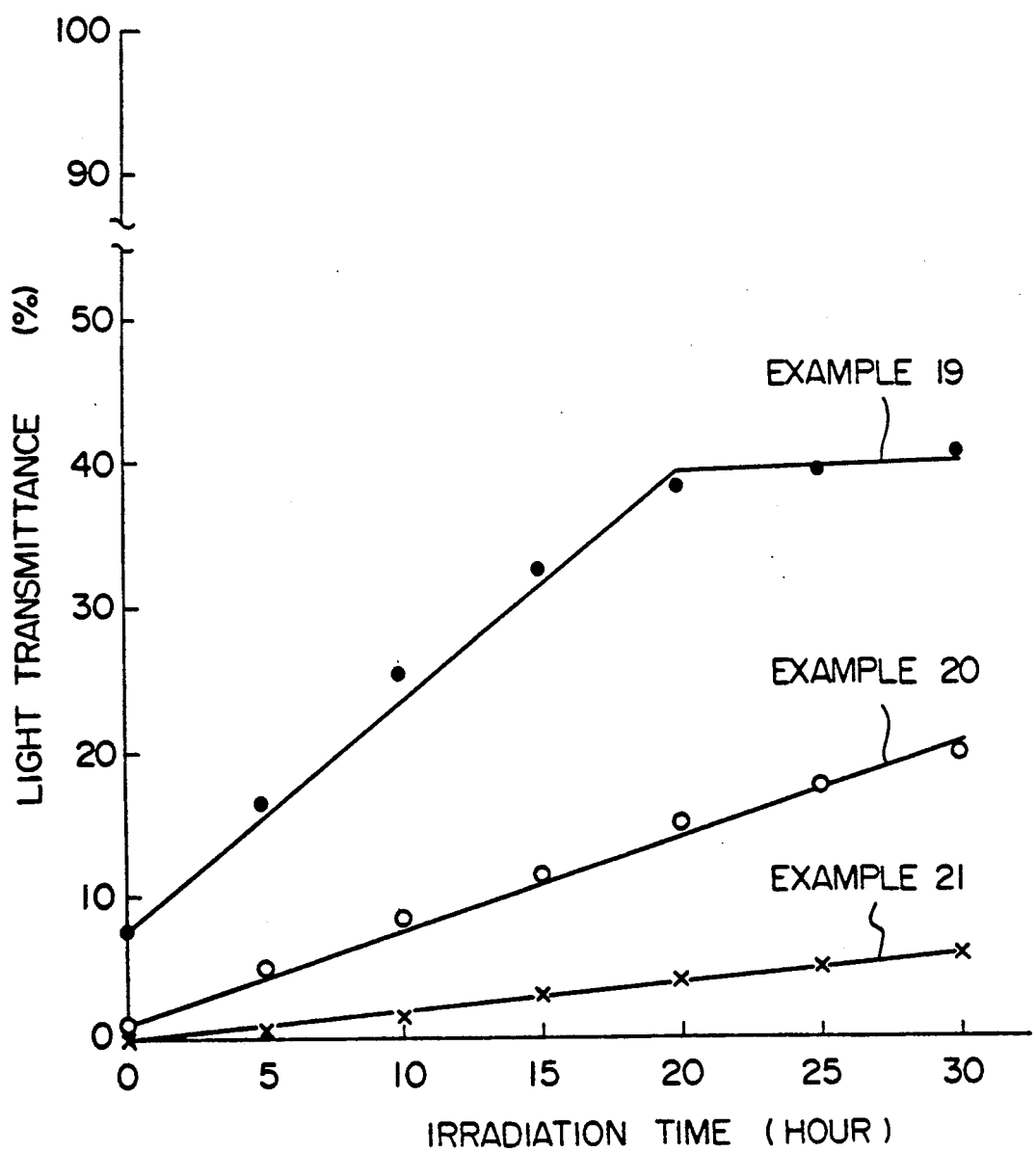
FIG. 3 is a drawing showing change of beam transmittance in accordance with light receipt time in one example of the present invention.

It is seen from Table-13 and FIG. 3 that in the present examples light transmittance of the films at a wavelength of 550 nm increases by light receipt of light containing ultraviolet radiation of at least 300 to 320 nm, moreover, almost linearly in accordance with increase of light receipt time (=receipt light quantity), and finally the color reaches an almost transparent state as seen in Example 19. Further, it is understood that these changes can be recognized and grasped as changes of the films.

The films prepared in this example are ones which when completely faded become transparent but slightly white turbid state, and thus light transmittance at a wavelength of 550 nm could reach only a little over 40%.

INDUSTRIAL APPLICABILITY

The raw material for receipt light quantity of ultraviolet radiation of the invention can be used, without its use being particularly restricted, in indoor or outdoor light atmosphere wherein ultraviolet radiation having the above wavelength region exists for medical cares, beauty cultures and scientific researches, preferably for medical cares. As for medical cares the present material can be used, for example, as a light quantity-measuring apparatus for measurement of quantity of receipt light from an ultraviolet radiation lamp for treatment of bacterial dermatitides. It has hitherto been known that the skin of a human being suffers striking damages by ultraviolet radiation of the above wavelength region. For example, as described in "Kosen Kabin Sho" (Light Hypersensitivity), first edition, all pages, particularly pages 5 to 47, edited by Yoshiaki Sato, published on Oct. 20, 1983 by Kanehara Shuppan Co., Ltd., and "BELL", No. 376, pages 3 to 7 and 12 to 15 published on May, 1988 by Kanebo Keshohin Honbu, ultraviolet radiation is an electromagnetic wave having a wavelength region of 100 to 400 nm, and ultraviolet radiations of respective wavelength regions of 100 to 190 nm, 191 to 290 nm, 291 to 320 nm, 321 to 360 nm and 361 to 400 nm are referred to as UVC, UVB, UVA-I and UVA-II, respectively. It is said that dermatitides are induced by light having wavelength shorter than UVA-I region, getting tanned by snow is generated mainly by UVA-I region, and erythemas (sunburn) is generated mainly by UVB region. In case of erythemas, inflammation becomes maximum 1 to 2 days after their generation, further the skin become black due to deposit of melamine 3 days thereafter, and stains and freckles and the like are generated and the skin further becomes thick. When UVB is further predominantly received, carcinoma cutaneum is generated to some people. It is considered effective in order to prevent generation of carcinoma cutaneum to take care not to be exposed to sunlight within the limits of the possibility and thus to prevent beforehand generation of erythemas.

However, it is the present state of things that since UVB quantity whereby erythema is generated is different among races and among individuals, there is no effective preventive means therefor. Further, in addition to the above matter, there is the fact that since erythema is not generated immediately after light receipt of UVB but gradually generated after 4 to 5 hours of time lapse, it is uncertain at the time point of light receipt of UVB whether erythema is generated or not, and thus there has been no means to prevent generation of erythema beforehand.

By carrying the present raw material for receipt light quantity of ultraviolet radiation under an atmosphere of light receipt of UVB, it is possible to stop light receipt before receipt light quantity reaches the previously determined minimum UVB quantity wherein erythema is generated, whereby it is possible to prevent generation of erythema beforehand. Thus, the present material can effectively be utilized in practice of outdoor sports and leisure time amusements such as fishing, tennis, walk, sunbathing and sea bathing.

As for beauty cultures, when artificial sunburn is carried out by an artificial lamp which emits ultraviolet radiation of UVB to UVA-I regions (such as a fluorescent lamp for health light beam FL-SE produced by Matsushita Electric Industrial Co., Ltd.), the present material can be used for the purpose of preventing excessive sunburn. As for scientific researches, the present material can effectively be used, for example, in chemical reactions utilizing ultraviolet radiation for controlling its receipt light quantity.

We claim:

1. An apparatus for measurement of receipt light quantity of ultraviolet radiation wherein a colored material is carried on a solid support which material discolors or fades in accordance with the receipt light quantity due to light receipt of ultraviolet radiation having wavelength in the range of at least 300 to 360 nm, wherein the colored material is phycocyanin or allophycocyanin further comprising means for indicating quantity of ultraviolet radiation using fading discoloration of the said colored material.

2. An apparatus for measurement of receipt light quantity of ultraviolet radiation wherein a colored material is carried on a solid support which material discolors or fades in accordance with the receipt light quantity due to light receipt of ultraviolet radiation having wavelength in the range of at least 300 to 360 nm, wherein said colored material is a dye extracted from algae further comprising means for indicating quantity of ultraviolet radiation using fading discoloration of the said colored material.

3. The apparatus for measurement of receipt light quantity of ultraviolet radiation of claim 2 wherein the colored material is a phycobilin series dye.

4. The apparatus for measurement of receipt light quantity of ultraviolet radiation of claim 3 wherein the colored material is a phycoerythrin.

5. A method of measurement of irradiation quantity of ultraviolet radiation which comprises exposing a colored material which discolors or fades in accordance with the receipt light quantity due to light receipt of ultraviolet radiation having wavelength in the range of at least 300 to 360 nm and is a dye extracted from algae, to sunlight and monitoring discoloration or fading of the colored material to detect irradiation quantity of ultraviolet radiation having wavelength in the range of at least 300 to 360 nm.

* * * * *